US007956006B2

(12) United States Patent
Gangwal et al.

(10) Patent No.: US 7,956,006 B2
(45) Date of Patent: *Jun. 7, 2011

(54) PROCESS FOR PREPARING ZINC OXIDE-BASED SORBENTS

(75) Inventors: Santosh Kumar Gangwal, Cary, NC (US); Brian Scott Turk, Durham, NC (US); Raghubir Prasad Gupta, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 421 days.

This patent is subject to a terminal disclaimer.

(21) Appl. No.: 11/771,396

(22) Filed: Jun. 29, 2007

(65) Prior Publication Data
US 2008/0026939 A1    Jan. 31, 2008

Related U.S. Application Data

(63) Continuation of application No. PCT/US2005/000007, filed on Jan. 6, 2005.

(51) Int. Cl.
*B01J 20/00* (2006.01)
(52) U.S. Cl. ........................................ 502/415; 502/414
(58) Field of Classification Search .................. 502/414, 502/415, 424
See application file for complete search history.

(56) References Cited

U.S. PATENT DOCUMENTS

| | | |
|---|---|---|
| 4,088,736 A | 5/1978 | Courty et al. |
| 4,218,346 A | 8/1980 | Walker et al. |
| 4,228,040 A | 10/1980 | Bertus et al. |
| 4,263,132 A | 4/1981 | Drehman et al. |
| 4,263,133 A | 4/1981 | Drehman et al. |
| 4,268,399 A | 5/1981 | Box, Jr. et al. |
| 4,287,050 A | 9/1981 | Eastman et al. |
| 4,304,687 A | 12/1981 | Box, Jr. et al. |
| 4,313,820 A | 2/1982 | Farha, Jr. et al. |
| 4,324,647 A | 4/1982 | Gardner |
| 4,327,238 A | 4/1982 | Eastman |
| 4,347,811 A | 9/1982 | Lee |
| 4,368,344 A | 1/1983 | Kolts |
| 4,371,458 A | 2/1983 | Eastman et al. |
| 4,371,507 A | 2/1983 | Farha, Jr. et al. |
| 4,371,728 A | 2/1983 | Farha, Jr. et al. |
| 4,372,842 A | 2/1983 | Gardner |
| 4,376,698 A | 3/1983 | Gardner et al. |
| 4,376,699 A | 3/1983 | Gardner |
| 4,389,304 A | 6/1983 | Eastman et al. |
| 4,389,305 A | 6/1983 | Gardner et al. |
| 4,389,337 A | 6/1983 | Eastman |
| 4,394,297 A | 7/1983 | Kolts |
| 4,394,301 A | 7/1983 | Gardner |
| 4,419,968 A | 12/1983 | Lee |
| 4,434,079 A | 2/1984 | Kolts |
| 4,446,013 A | 5/1984 | Aldag, Jr. |
| 4,463,213 A | 7/1984 | Aldag, Jr. |
| 4,477,592 A | 10/1984 | Aldag, Jr. |
| 4,636,371 A | 1/1987 | Farha, Jr. |
| 4,652,546 A | 3/1987 | Aldag, Jr. et al. |
| 4,655,906 A | 4/1987 | Bjornson et al. |
| 4,693,991 A | 9/1987 | Bjornson et al. |
| 4,707,246 A | 11/1987 | Gardner et al. |
| 4,762,814 A | 8/1988 | Parrott et al. |
| RE33,393 E | 10/1990 | Kidd |
| 4,990,318 A | 2/1991 | Kidd |
| 5,045,522 A | 9/1991 | Kidd |
| 5,077,261 A | 12/1991 | Schubert |
| 5,094,996 A | 3/1992 | Kidd |
| 5,102,854 A | 4/1992 | Delzer et al. |
| 5,108,975 A | 4/1992 | Schubert et al. |
| 5,130,288 A | 7/1992 | Delzer et al. |
| 5,143,706 A | 9/1992 | Schubert |
| 5,151,257 A | 9/1992 | Kidd |
| 5,174,919 A | 12/1992 | Cymbaluk et al. |
| 5,177,050 A | 1/1993 | Schubert |
| 5,178,843 A | 1/1993 | Delzer et al. |
| 5,219,542 A | 6/1993 | Lowery et al. |
| 5,248,489 A | 9/1993 | Kidd et al. |
| 5,250,089 A | 10/1993 | Delzer et al. |
| 5,254,516 A | 10/1993 | Gupta et al. |

(Continued)

FOREIGN PATENT DOCUMENTS

| | | |
|---|---|---|
| WO | WO 99/42201 A1 | 8/1999 |
| WO | WO 02/18043 A1 | 3/2002 |
| WO | WO 02/22763 A1 | 3/2002 |

OTHER PUBLICATIONS

Gangwal, S., et al., "Development of Fluidized-bed Sorbent for Desulfurization of Chevron-Texaco Quenched Gasifier Syn Gas", Paper presented at the 19th International Pittsburgh Coal Conference in Pittsburgh, PA, Sep. 23, 2002. Jensen, J.R., et al. "Preparation of ZnO-Al$_2$O$_3$ Particles in a Premixed Flame", 2000, *Journal of Nanoparticle Research*, vol. 2, pp. 363-373.

*Primary Examiner* — Edward Johnson
(74) *Attorney, Agent, or Firm* — Womble Carlyle Sandridge & Rice PLLC

(57) ABSTRACT

The disclosure relates to zinc oxide-based sorbents, and processes for preparing and using them. The sorbents are preferably used to remove one or more reduced sulfur species from gas streams. The sorbents comprise an active zinc component, optionally in combination with one or more promoter components and/or one or more substantially inert components. The active zinc component is a two phase material, consisting essentially of a zinc oxide (ZnO) phase and a zinc aluminate (ZnAl$_2$O$_4$) phase. Each of the two phases is characterized by a relatively small crystallite size of typically less than about 500 Angstroms. Preferably the sorbents are prepared by converting a precursor mixture, comprising a precipitated zinc oxide precursor and a precipitated aluminum oxide precursor, to the two-phase, active zinc oxide containing component.

32 Claims, 1 Drawing Sheet

U.S. PATENT DOCUMENTS

| | | |
|---|---|---|
| 5,268,152 A | 12/1993 | Delzer et al. |
| 5,281,445 A | 1/1994 | Khare |
| 5,310,717 A | 5/1994 | Delzer et al. |
| 5,358,921 A | 10/1994 | Kidd et al. |
| 5,360,468 A | 11/1994 | Schubert |
| 5,366,717 A | 11/1994 | Dorchak et al. |
| 5,370,848 A | 12/1994 | Delzer et al. |
| 5,439,867 A | 8/1995 | Khare et al. |
| 5,447,702 A | 9/1995 | Campbell et al. |
| 5,494,880 A | 2/1996 | Siriwardane |
| 5,560,900 A | 10/1996 | Gbordzoe et al. |
| 5,578,093 A | 11/1996 | Campbell et al. |
| 5,703,003 A | 12/1997 | Siriwardane |
| 5,710,091 A | 1/1998 | Khare |
| 5,714,431 A | 2/1998 | Gupta et al. |
| 5,798,088 A | 8/1998 | Dorchak et al. |
| 5,866,503 A | 2/1999 | Siriwardane |
| 5,914,288 A | 6/1999 | Turk et al. |
| 5,972,835 A | 10/1999 | Gupta |
| 6,306,793 B1 | 10/2001 | Turk et al. |
| 6,479,429 B1 | 11/2002 | Khare |
| 6,649,555 B2 | 11/2003 | Dodwell et al. |
| 6,656,877 B2 | 12/2003 | Sughrue et al. |
| 6,743,405 B1 | 6/2004 | Siriwardane |
| 6,812,189 B1 | 11/2004 | Vierheilig et al. |
| 6,890,877 B2 | 5/2005 | Meier et al. |
| 6,930,074 B2 | 8/2005 | Khare et al. |
| 6,951,635 B2 | 10/2005 | Gangwal et al. |
| 7,067,093 B2 | 6/2006 | Vierheilig et al. |
| 7,241,929 B2 | 7/2007 | Sughrue et al. |
| 7,259,286 B2 | 8/2007 | Jothimurugesan et al. |
| 2003/0047489 A1 | 3/2003 | Khare |
| 2003/0114299 A1 | 6/2003 | Khare |
| 2003/0118495 A1 | 6/2003 | Khare et al. |
| 2003/0232723 A1 | 12/2003 | Dodwell et al. |
| 2004/0004023 A1 | 1/2004 | Sughrue et al. |
| 2004/0004029 A1 | 1/2004 | Khare et al. |
| 2004/0120875 A1 | 6/2004 | Morton et al. |
| 2005/0098478 A1 | 5/2005 | Gupta et al. |

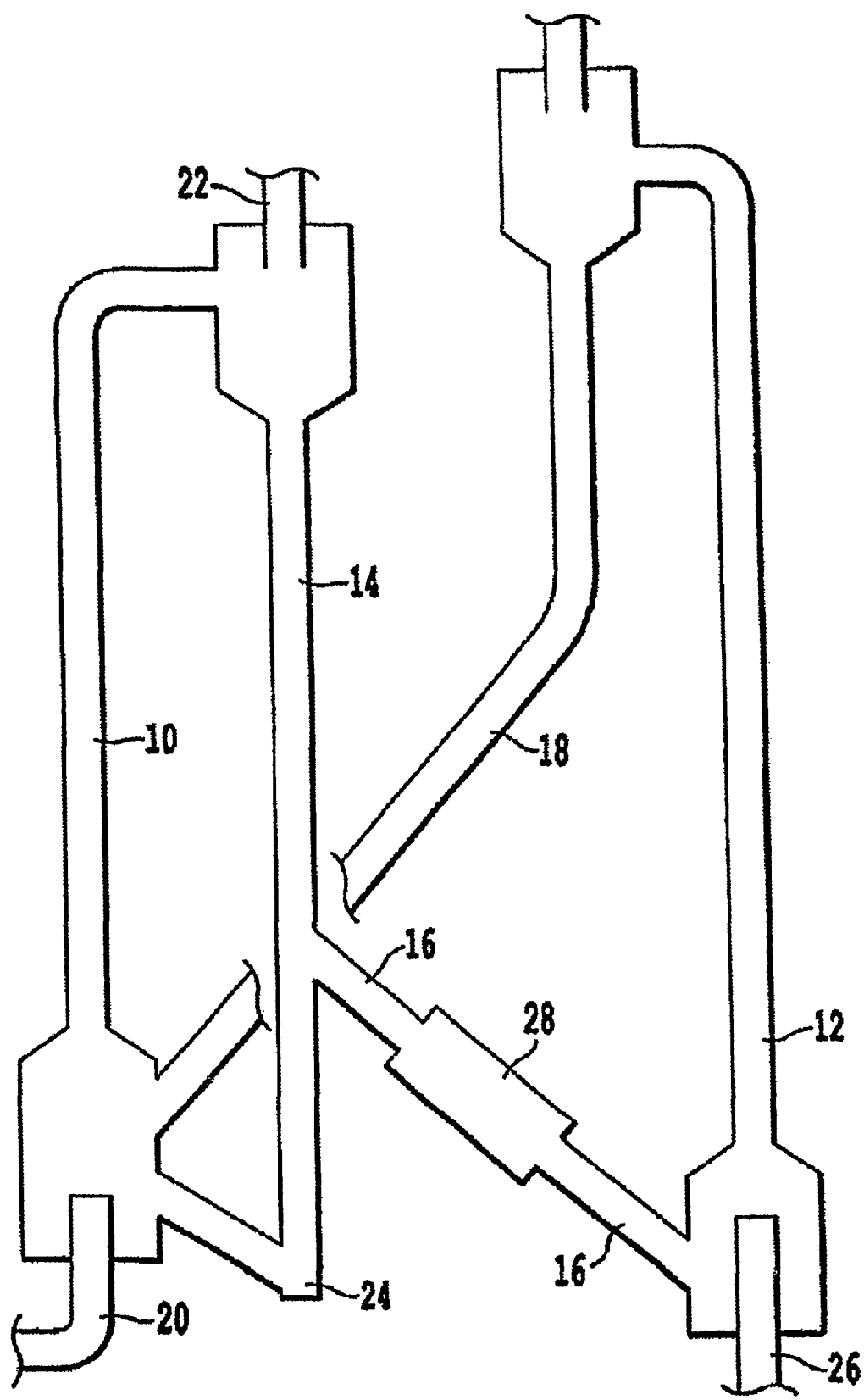

PROCESS FOR PREPARING ZINC OXIDE-BASED SORBENTS

CROSS-REFERENCE TO RELATED APPLICATIONS

This application is a continuation of PCT Application No. PCT/US2005/000007, filed Jan. 6, 2005, which is incorporated by reference herein in its entirety.

FEDERALLY SPONSORED RESEARCH OR DEVELOPMENT

This invention was made with Government support under Contract No. DE-AC26-99FT40675 awarded by the U.S. Department of Energy (DOE). The United States Government has certain rights in this invention.

FIELD OF THE INVENTION

This invention relates to zinc oxide-based sorbents, and to processes for preparing and using these sorbents. More specifically, the invention relates to attrition resistant, fluidizable, zinc oxide-based sorbents, and to processes for removing reduced sulfur species, particularly $H_2S$ and COS, from gas streams.

BACKGROUND OF THE INVENTION

Many industrial gases contain $H_2S$ and COS. Examples include, but are not limited to fuel gases, Claus plant tail gases, and hydrocarbon feeds for reforming and other processes.

One such fuel gas, syngas, is prepared by reforming a carbonaceous fuel by contacting it with an oxygen donor under high temperature conditions to produce a fuel gas containing $H_2$ and CO fuel components, which are typically recovered as a mixture with $CO_2$, steam and gaseous contaminants including $H_2S$, and COS. The carbonaceous fuel can be any of various solid, liquid, or gaseous materials having a substantial elemental content of carbon and hydrogen. Such materials include, for example, coal or coke, liquid feedstocks such as heavy naphtha fractions, and/or gaseous feedstocks such as natural gas. Commercial syngas processes typically include a desulfurization unit to remove $H_2S$ and COS sulfur species from the syngas.

Various desulfurization processes are known in the art. The current commercial process for removing $H_2S$ from steam-containing syngas streams involves cooling the initial product gas to a temperature below its dew point to remove water and then contacting the gas with an aqueous solvent containing amines. However, cooling of a fuel gas stream, such as syngas, reduces the thermal efficiency of the process often making this processing technology less advantageous compared to other competing technologies. Amine-based scrubbing processes also have technical problems such as the formation of heat stable salts, decomposition of amines, and are additionally equipment-intensive, thus requiring substantial capital investment.

In recent years, substantial research and investment has been directed towards various syngas processes, such as the "Integrated-Gasification-Combined-Cycle" (1GCC) gasification process, for generating syngas which can be used as the feed in a power plant for the generation of energy, raw material for generation of high-value chemical or transportation fuels, and a hydrogen source for fuel cells. Although this technology offers considerable improvement in both thermal and environmental efficiency, the cost of this technology is currently impeding market penetration of this technology. One approach being investigated to substantially reduce cost involves the incorporation of a water quench in the gasification process. This water quench readily removes almost all of the solid and chemical contaminants in the syngas. Unfortunately, the treatment does not remove the sulfur, and increases the steam to 60 volume percent, or more. Under these conditions, a hot-gas desulfurization process operating between 204-370° C. (400-700° F.) would have significant technical and cost advantages over other desulfurization technologies, particularly amine-based processes. Economic evaluation also indicates that this syngas process has a cost advantage over competing technologies.

The use of solid sorbents has been proposed to remove $H_2S$ and COS from power plant fuel gasses and to increase efficiency of the power plants. Preferred sorbents are regenerable materials that can be recycled and reused for numerous cycles, thereby reducing the overall process cost. Various solid sorbent materials have been used commercially to remove $H_2S$ from hydrocarbon streams. For example, zinc oxide is used in guard beds to remove $H_2S$ according to the reaction:

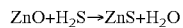
$$ZnO+H_2S \rightarrow ZnS+H_2O$$

Although zinc oxide can theoretically be regenerated by burning off the sulfur at elevated temperatures according to the reaction:

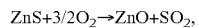
$$ZnS+3/2O_2 \rightarrow ZnO+SO_2,$$

special sorbent compositions are necessary so that structural and chemical stability are maintained by the sorbent during regeneration. For example, zinc oxide guard bed materials are designed to have high sulfur removal activity resulting from the high surface area and zinc oxide content. However, upon regeneration the guard bed materials are destroyed, because of high temperatures required for regeneration, physical transformations caused by regeneration and competing reactions. During regeneration, the conversion of the ZnS back into ZnO results in not only the obvious chemical transformation, but also in a physical transformation associated with the size and shape of the molecules and their crystallites. The restructuring necessary for these transformations stretches, bends and twists the material altering its structure and mechanical integrity. The more ZnO converted to ZnS, the more substantial the restructuring changes are. The high temperature and exothermic nature of the regeneration reaction also increase the thermal stress and potential for sintering experienced by the material during regeneration. Finally, competing reactions result in the conversion of the ZnS into an inactive sulfate rather than ZnO.

Special sorbent compositions are not only necessary for the chemistry associated with regenerable desulfurization, but also the physical requirements of the reactor system used. One of the most promising reactor systems for this application involves transport reactor systems. These systems provide a convenient means of continuously moving sorbent material between the desulfurization reactor and regeneration reactor. These systems also provide excellent temperature control for the exothermic regeneration reactions.

Hot gas desulfurization using coupled, fluidized transport bed reactors wherein the contaminated gas stream is contacted with a solid sorbent in the first fluidized bed reactor, and the sorbent is regenerated in the second reactor, is described, for example, in Campbell, William N. and Henningsen, Gunnar B., *Hot Gas Desulfurization Using Transport Reactors*, publication from the M. W. Kellogg Company, pp 1059-64, 12th Annual International Pittsburgh Conference Proceedings, September 1995, and in U.S. Pat. No. 5,447,702, issued on Sep. 5, 1995 to Campbell et al. Such fluidized bed processes provide substantial benefits. However, the use of fluidized beds requires that the sorbent be made in particulate form (typically 100 µm average size) and have high mechanical and chemical attrition resistance in addition to high reactivity for $H_2S$ and COS.

U.S. Pat. No. 4,088,736 to Courty et al. teaches the production of regenerable $H_2S$ sorbents from a physical mixture of zinc oxide, alumina and a Group IIA metal oxide such as calcium oxide. The mixture is calcined at elevated temperatures (>500° C.) to provide a composition in which the Group IIA metal oxide combines with alumina to yield a Group IIA metal aluminate, which is said to enhance strength properties of the final sorbent. The material is formed into pellets for use in fixed-beds.

U.S. Pat. Nos. 5,254,516 and 5,714,431 to Gupta et al. disclose processes for preparing and using sorbents based on zinc titanate. As discussed in the Gupta et al patents, particularly the '516 patent, zinc oxide-based sulfur sorbents are generally unsatisfactory for removal of sulfur from reducing gasses, such as fuel gases, at temperatures exceeding about 900° F. (482° C.) because $H_2$ and CO components present in these gases reduce ZnO to Zn metal resulting in loss of the active zinc component by evaporation or sublimation. The zinc titanate sorbents disclosed in the Gupta et al patents are prepared by blending zinc oxide and titanium dioxide with binders followed by granulation and/or spray drying and calcinations at high temperature (750-950° C.). The resultant sorbents typically have a surface area in the range of from 0.3 to 4 $m^2/g$, and are suitable for removal of $H_2S$ and COS contaminants from a fuel gas at high temperatures (typically in excess of 500° C.). However, these sorbents cannot, as a practical matter, be used to remove H2S and COS contaminants from fuel gas streams at temperatures in the range of 204-370° C., due to the low reactivity of the sorbents at these temperatures.

U.S. Pat. Nos. 5,494,880, 5,703,003, and 5,866,503, to Siriwardane disclose regenerable sorbent materials which include a binder, an active material and an inert material. A preferred active sorbent material is zinc oxide. These sorbent materials have numerous desirable chemical and physical properties, including the provision of a regenerable sorbent based on zinc oxide. Nevertheless, these sorbents were typically prepared in the form of 3-4 mm ellipsoidal pellets, and attempts to produce these sorbent materials for use in fluidized-bed reactors have not resulted in any material having sufficient attrition resistance to allow use in fluidized bed reactors.

PCT Application WO 99/42201 discloses regenerable, attrition resistant, spray dried, sulfur sorbents comprising a zinc titanate component and a metal aluminate, preferably zinc aluminate, component. The sorbents are preferably free of unreacted alumina. The zinc aluminate component enhances the strength, particularly the attrition resistance, of the zinc titanate. "Poisoning" of the zinc titanate by alumina, as would normally occur during high temperature regeneration of conventional zinc titanate/alumina sorbents, is substantially eliminated because the zinc-reactive sites on the alumina component are already occupied by zinc ions. Because these sorbents are based on zinc titanate, and also as a result of their high zinc aluminate content, they are only useful for substantial sulfur removal at temperatures exceeding about 500° C. (932° F.).

Numerous other sorbent materials have been proposed for removal of reduced sulfur species, such as $H_2S$ and COS, from reducing gas streams. However no currently available sorbent material possesses the necessary attributes for removal of $H_2S$ and COS contaminants from a low temperature gas stream in a system using fluidized bed desulfurization and regeneration zones due to one or more of the following deficiencies: (i) the sorbent is not regenerable; (ii) the sorbent lacks sufficient $H_2S$ and COS reactivity at temperatures below 370° C. (about 700° F.); (iii) the sorbent is not available in a physical form of a size, shape, and density, suitable for fluidization, and/or; (iv) the sorbent is not sufficiently attrition resistant for use in fluidized-bed applications.

SUMMARY OF THE INVENTION

According to one aspect, the present invention provides zinc oxide-based sorbent compositions capable of removing reduced sulfur species, particularly $H_2S$ and COS, from a gas stream. The sorbent compositions are regenerable, and can readily be produced with the necessary reactivity, stability, and mechanical strength properties, and in a suitable physical form and size, allowing their use across a temperature range including relatively low temperatures and relatively high temperatures, in fluidized-bed, including transport bed, reactors. According to another aspect, the present invention provides a process for removal of $H_2S$ and COS from a reducing gas stream, preferably a fuel gas stream, at a temperature that can be as low as about 400° F. or as high as about 1000° F. In currently preferred embodiments, the fuel gas stream can have a substantial steam content, typically exceeding 50% by volume.

The sorbent compositions of the invention comprise an active zinc component, optionally in combination with one or more promoter components and/or one or more substantially inert components. The active zinc component preferably constitutes at least about 75 wt % (weight percent), more preferably at least about 80 wt %, even more preferably at least about 90 wt % of the sorbent composition. The active zinc component is a two phase material, consisting essentially of a zinc oxide (ZnO) phase and a zinc aluminate ($ZnAl_2O_4$) phase. Each of the two phases is uniformly distributed throughout the active, sorbent particles, and each of the two phases is characterized by a relatively small crystallite size of typically less than about 500 Angstroms and preferably less than 400 Angstroms, more preferably less than about 350 Angstroms, as determined by x-ray diffraction line broadening analysis. Advantageously, the total zinc oxide content of the active zinc component is an amount, calculated as "total ZnO" (which includes both uncombined zinc oxide, i.e., the zinc oxide which constitutes the zinc oxide phase, and combined zinc oxide, i.e., the ZnO content of the zinc aluminate phase wherein $ZnAl_2O_4$ is taken to be the combination of ZnO and $Al_2O_3$), of at least about 50 wt %, up to about 80 wt %, preferably at least about 58 wt % up to about 80 wt %, based on the total weight of the active zinc component. Stated differently, the active zinc component includes at least about 10 wt % uncombined zinc oxide (corresponding to the zinc oxide phase, alone), up to about 65 wt % uncombined zinc oxide, preferably about 20 wt % to about 40 wt % uncombined zinc oxide. Preferably the sorbent composition is substantially free from any binder and/or other chemically inert material.

Preferably the attrition resistant, zinc oxide-based sorbents of the invention are prepared by converting a precursor mixture, comprising a precipitated zinc oxide precursor and a precipitated aluminum oxide precursor, to the two-phase, active zinc oxide containing component. The use of precipitated precursors, which typically have an extremely small size, promotes enhanced mixing and uniform distribution of the zinc oxide and zinc aluminate phases in the active zinc sorbent component, and also promotes formation of small crystallite phases in the active zinc component.

While not wishing to be bound by theory, the inventors currently believe that the chemical make-up and physical structure of the active zinc component cooperate to provide an unusual combination of high chemical reactivity, high temperature stability, and mechanical strength properties, which are not normally available with zinc oxide-based sorbents. In particular, the two phases of the active zinc component, zinc oxide and zinc aluminate, provide chemical reactivity for sulfur removal (zinc oxide) and desirable mechanical and high temperature regeneration properties (zinc aluminate). The unusually small crystallite sizes of the zinc oxide and zinc aluminate phases enhance the mechanical strength of the sorbent. The unusually small crystallite sizes of the zinc oxide and the zinc aluminate phases are also believed to increase the chemical reactivity and high temperature stability of the sorbent. In contrast, conventionally prepared pure zinc aluminate, i.e., zinc aluminate which is free (or substantially free) from unreacted alumina, requires harsh calcinations conditions involving extremely high temperatures and/or extended treatment times. It is now believed that these harsh calcinations conditions promote growth of the crystalline structure of the zinc aluminate, and also tend to promote collapse of the desirable pore structure of the zinc aluminate. Accordingly, it is now believed that incorporation of conventionally formed zinc aluminate into a sulfur sorbent, provides a less-than-optimal pore structure in the final sorbent product, decreasing in turn, the sulfur-removal capacity of the final sorbent product. In addition to an improved pore structure, or alternatively, the enhanced zinc aluminate structure may cooperate with the small crystalline size of the zinc oxide phase, to provide improved mechanical or chemical "encapsulation" of the zinc oxide by the zinc aluminate, thereby enhancing retention of zinc that might otherwise be reduced to zinc metal and evaporated under high temperature reducing conditions. Further, the small crystalline size of the zinc oxide phase can potentially enhance availability of the zinc oxide for reaction with sulfur contaminants, while also minimizing impact of the zinc oxide on the more desirable mechanical strength of the zinc aluminate structure.

Currently the small crystalline size, two phase, active zinc component is preferably obtained by employing the sorbent-preparation process identified above. According to this process, an aqueous slurry containing a mixture of non-oxide precursors of zinc oxide and alumina, is spray dried to form precursor sorbent particles of a desirable size, and the precursor particles are thereafter calcined to convert the precursors into the two phase (zinc oxide and zinc aluminate) active zinc component. The use of extremely small non-oxide precursors, allows mixing of the zinc and aluminum components at a "near-molecular level" prior to formation of any sorbent structure whatsoever. Accordingly, this process allows small amounts of zinc oxide to be dispersed throughout the sorbent in a near-molecular form, providing high reactivity. In addition, the high surface area and preferred uniform mixing of the precursors allows the formation of zinc aluminate using less harsh calcinations conditions than are required by conventional zinc aluminate forming processes which involve a solid state reaction between alumina and zinc oxide.

Preferably, the sorbent compositions of the invention are substantially spheroidal particles having sizes in the range of from 35 to 175 micrometers (μm), preferably from 40 μm to 150 μm, more preferably from 40 μm to 120 μm, as determined by conventional screening processes.

In preferred embodiments, the attrition resistant, zinc oxide-based sorbent compositions of the invention have a compacted bulk density exceeding 1 $g/cm^3$ (gram per cubic centimeter), more preferably exceeding 1.3 $g/cm^3$. Additionally, the attrition index (AI) of the preferred zinc oxide-based sorbent compositions as measured by ASTM-D5757-95 is preferably less than 2, where AI is defined as:

AI=(Attrition at 5 hours minus Attrition at 1 hour)/4, wherein "Attrition" is determined in accordance with the above-identified ASTM Standard in each instance. The relatively high bulk density in preferred sorbents of the invention, can allow a higher feed stream throughput in various fluidized bed environments, can enhance temperature control of the overall process due to the higher heat capacity of the particles, and can allow the use of larger mass quantities of the active sorbent within the fixed volume of a given reactor, as compared to a lower density sorbent. As will be apparent, the preferred AI values effectively allow the economical use of the sorbent particles in high velocity fluidized bed environments.

According to another aspect, the present invention provides a process for preparing attrition resistant, zinc oxide-based sorbent compositions by converting a mixture of precipitated zinc oxide and aluminum oxide precursors to the two-phase, active zinc component. The use of precipitated precursors, which typically have an extremely small size, promotes enhanced mixing and uniform distribution of the final sorbent components, and additionally promotes formation of small crystallite phases in the final sorbent product. Advantageously, the process comprises the steps of forming a slurry which comprises a precipitated precursor of zinc oxide and a precipitated precursor of aluminum oxide, and spray drying the slurry to form substantially spherical particles. Preferably, the precipitated zinc oxide precursor and the precipitated aluminum oxide precursor are simultaneously formed in a coprecipitation process. Typically the slurry containing the precursors which is used for spray drying, has 88 to 92 weight percent weight loss on ignition at a temperature of 500° C. or greater. Advantageously the zinc oxide precursor, calculated as ZnO, comprises at least about 50 wt % of the solids content, up to about 80 wt % of the solids content of the slurry residue remaining after a loss on ignition at a temperature of 500° C. or greater, hereafter referred to as dry solids content of the slurry. Advantageously, the aluminum oxide precursor, calculated as $Al_2O_3$, comprises at least about 20 wt % of the dry solids content of the slurry, up to about 50 wt % of the dry solids content of the slurry. The spray dried particles are calcined for a time and at a temperature sufficient to convert substantially all of the aluminum oxide precursor to zinc aluminate, and to convert substantially all the remaining zinc oxide precursor to zinc oxide. In one preferred aspect of the invention, the slurry is treated with sufficient strong acid to reduce the pH to less than about 4.5, preferably about 4.0 to 4.3, but no less than about 3.5. In accordance with this aspect of the invention, it has been found that reducing the slurry pH to less than 4.5, before spray drying significantly improves the attrition properties, i.e., reduces the attrition loss and the AI, of the zinc oxide-based sorbent composition without affecting its reactivity for $H_2S$ and COS.

The present invention additionally includes preferred processes for removing sulfur contaminants from a fuel gas employing the zinc-oxide based sorbents of the invention. In particular, the zinc-oxide based sorbents of this invention have been found capable of reducing the combined $H_2S$ and COS contents of fuel gases to low levels, preferably below about 20 ppmv (parts per million by volume), more preferably to levels below about 10 ppmv, by treatment of the fuel gas at temperatures as low as 400° F. (204° C.) and at temperatures as high as 1000° F. (538° C.). Thus, the desulfurization sorbents and processes of the invention provide a substantial degree of flexibility allowing removal of undesirable sulfur components from a feed gas by treatment at a selected temperature in the range of between about 400° F. and about 1000° F. (between about 204° C. and about 538° C.).

The zinc-oxide based sorbents are employed in transport reactor systems in preferred process embodiments. Such preferred process embodiments can be achieved, as a result, at least in part, of the high reactivity, and high attrition resistance of the zinc oxide-based sorbents of the invention. Moreover, the zinc-oxide based sorbents of the invention are capable of retaining their high reactivity, and high attrition resistance over a substantial number of absorption-regeneration cycles conducted in accord with preferred sorbent regeneration process embodiments of the invention which are carried out at temperatures in the range of between about 950° F. and about 1350° F. (about 510° C. to about 732° C.), preferably within the range of between about 1000° F. and about 1300° F. (about 538° C. and about 704° C.).

BRIEF DESCRIPTION OF THE DRAWINGS

In the drawings which form a portion of the original disclosure of the invention, the FIGURE illustrates one preferred process for removing sulfur contaminants from a fuel gas employing the zinc-oxide based sorbents of the invention.

DETAILED DESCRIPTION OF THE PREFERRED EMBODIMENT

In the following detailed description, preferred embodiments of the invention are described to enable practice of the invention. Although specific terms are used to describe and illustrate the preferred embodiments, such terms are not intended as limitations on practice of the invention. Moreover, although the invention is described with reference to the preferred embodiments, numerous variations and modifications of the invention will be apparent to those of skill in the art upon consideration of the foregoing, together with the following detailed description.

As indicated previously, the sorbent compositions of the invention can optionally include, in combination with the active zinc oxide-based sorbent component, promoter components and chemically inert components (the latter including components that may exhibit measurable but only minimal chemical activity), in amounts of up to 25 wt %, based on the total weight of the sorbent, preferably less than 20 wt %, more preferably less than 10 wt % of the total sorbent weight. Sorbent compositions which are substantially free of inert components such as binders or the like are currently preferred in the practice of the invention.

For ease of discussion and clarity of disclosure, the sorbent compositions disclosed and discussed hereinafter shall be assumed to be free of promoter and inert components, except where stated to the contrary. Thus, the terms "sorbent", "sorbents" "sorbent compositions", "sorbent materials" and the like, are used hereinafter to refer to the active zinc component except in those specific instances in which the disclosure is specifically directed to compositions including one or more of the optional promoter or inert components.

The zinc oxide-based sorbent compositions of the invention are advantageously prepared from starting materials including a precipitated zinc oxide precursor and a precipitated aluminum oxide precursor, which are used in predetermined amounts or weight ratios. Unless expressly stated otherwise, all weight percentages are calculated and expressed based on the "adjusted weight" of the sorbent components and compositions. "Adjusted weight" of the sorbent compositions, sorbent components, sorbent component precursors, slurries and slurry components used to form sorbent of this invention, as used herein, refers to the actual weight adjusted as necessary so that the zinc oxide component or precursor is calculated as ZnO, and the aluminum oxide component or precursor is calculated as $Al_2O_3$, and the zinc aluminate component is calculated as $ZnAl_2O_4$. Further, unless expressly stated otherwise, all weight percentages of sorbents (including sorbents present in both green and calcined states), sorbent components, sorbent component precursors, slurries and slurry components used to prepare the sorbents, are expressed herein such that the zinc oxide component or precursor, the aluminum oxide component or precursor, and the sorbent compositions, are in each case calculated as adjusted weight.

The terms "total ZnO" and "total zinc oxide" with reference to sorbent compositions, sorbent components, sorbent component precursors, slurries and slurry components used to form sorbent compositions of the invention, refers to the total adjusted weight of uncombined and combined zinc oxide, i.e., the zinc oxide which is present in the final sorbent composition as the zinc oxide phase, and the zinc oxide content of the zinc aluminate phase in the final sorbent composition, respectively. For purposes of these calculations, the zinc aluminate phase, $ZnAl_2O_4$, is taken to be the combination of ZnO and $Al_2O_3$.

The term, "substantially free", is used herein to mean a weight percent content or an adjusted weight percent (where applicable) content of about 1 percent or less.

The term, "compacted bulk density", is used herein to mean the density as determined by ASTM standard method D4781-99 or equivalent.

"Crystallite size" of the zinc oxide (ZnO) phase and the zinc aluminate ($ZnAl_2O_4$) phase is determined by x-ray diffraction line broadening analysis of the most intense peak for each of these phases. The qualitative data for this analysis were collected using CuK generated at 45 kV and 40 mA on a Shimadzu model XRD-6000 outfitted with a 1° divergence slit, a 0.3 mm receiving slit, and a diffracted beam monochromator. Samples are initially inspected to ensure that the particles or agglomerations of particles are between 40 and 70 microns. Samples, that do not meet these specifications, are ground using a mortar and pestle with moderate hand pressure for no more than one minute to reduce and homogenize particle size.

Samples are loaded into an XRD sample holder and the material is packed into the holder as tightly as possible with hand pressure using a glass slide to ensure that a flat surface is attained, which is on the same plane as the surface of the sample holder. If sample is not loaded correctly into the XED sample holder, the surface of the sample will not form a continuous flat plane with the surface of the sample holder. A poorly loaded sample will result in data, which has shifted or biased the peak position.

The XRD pattern is measured with a Shimadzu XRD-6000. This instrument uses a copper source stimulated with 45 kV and 40 mA to generate Cu Kα X-rays with a maximum output of 2 kW. These x-rays pass through a 1° divergence slit. The sample is scanned from 8 to 62 degrees 2θ. The scan rate is 0.02 degrees per 2 seconds. A 3 mm receiving slit and diffracted beam monochromator process the radiation prior to a sodium iodide scintillation counter, which measures counts per second. The operation and data collection of the Shimadzu 6000 is controlled by Shimadzu XRD-6000 V4.1 software.

The raw data generated by the Shimadzu XRD-6000 V4.1 software is reformatted by a python language program as suitable input for software for interpreting and analyzing the XRD diffraction patterns. The interpretation software is Jade 3.1. One of the values that is calculated by the Jade software is crystallite size. The crystallite size is calculated according to the formula:

$$\text{Size(Angstroms)} = \{0.9 \times W / [FWHM - (GW)^2]^{1/2}\} / \cos\theta,$$

where W, the X-ray wavelength for the Cu source, is 1.540562 angstroms, FWHM is the reported peak width at half maximum in radians as determined by the software, GW is the inherent broadening factor for this instrument and theta is half the reported peak centroid. The final reported crystallite size for each crystalline phase is the crystallite size calculated by the Jade software for the most intense peaks for the zinc oxide and zinc aluminate phases.

According to one preferred aspect of the invention, the attrition resistant zinc oxide-based sorbent of the invention is prepared by spray drying a slurry which comprises a precipitated zinc oxide precursor and a precipitated aluminum oxide (alumina) precursor. Precipitated zinc oxide precursors and precipitated alumina precursors are well known to those skilled in the art and include, for example, nitrates, sulfates, chlorides, acetates, alkoxides and like salts of zinc and aluminum. Precipitated zinc oxide and alumina precursors can readily be combined to achieve a significantly higher mixing at the molecular level as compared to mixing of the oxides in dry or wet form. In turn, the final zinc oxide-based sorbent is found to contain zinc oxide (ZnO) phase and a zinc aluminate ($ZnAl_2O_4$) phase that are uniformly distributed throughout the sorbent, and each of the two phases is characterized by a relatively small crystallite size.

Currently preferred zinc oxide and alumina precursors are $Zn(NO_3)_2$ and $Al(NO_3)_3$, respectively. Advantageously, at least 50 wt % (as zinc oxide) of dry solids content of the slurry is made up by the precipitated zinc oxide precursor or derivative. Advantageously, the zinc oxide precursor is a wet filtered cake recovered directly from a precipitation process or step. Preferably at least 20 wt % (as $Al_2O_3$) of dry solids content is made up by the precipitated aluminum oxide precursor or derivative. Advantageously, the aluminum oxide precursor is also a wet filtered cake well mixed with the zinc oxide precursor cake recovered directly from a precipitation process or step. Preferably, the precipitated zinc oxide precursor and the precipitated aluminum oxide precursor are simultaneously formed in a coprecipitation process.

Although not currently preferred, the slurry can also contain active metal promoter materials, or precursors thereof, binder materials or precursors thereof, and/or inert refractory oxide materials or precursors thereof. Preferably, the total dry solids content of such materials, based on adjusted weight, is less than about 25 wt %, more preferably less than about 20 wt %, even more preferably less than about 10 wt %, most preferably, less than about 5 wt %. Exemplary active metal promoters include metal oxides such as nickel or other Group 6, 8, 9, or 10 metal oxides, copper oxides, and oxides of iron, silver, gold. Binders and inert refractory inorganic oxides can include naturally occurring clays, silicas, aluminosilicates, zeolites and the like.

In a preferred embodiment of the invention, the slurry is further treated with sufficient strong acid to reduce the pH to less than 4.5, preferably to 4.0 to 4.3. Reducing the slurry pH to below 4.5, preferably to 4.0 to 4.3, before spray drying has been found to significantly improve the attrition properties of the sorbent. The slurry is spray dried using conventional processes and apparatus to form substantially spheroidal spray dried particles.

It is to be noted that acid treatment of the precipitated zinc oxide precursor and/or the precipitated aluminum oxide precursor prior to spray drying, can, in at least some cases, change the chemical identity of the precursor. Nevertheless, as long as the modified precursor, (or precursors), is readily convertible to the final oxide product(s) by calcination, such modification does not interfere with formation of the sorbent. As will be apparent to the skilled artisan, other treatments which modify the chemical identity of the oxide precursor(s) may also be applied to the oxide precursors, as long as the modified precursor, (or precursors), is readily convertible to the final oxide product(s) by calcinations. Such modified or derivative, precipitated oxide precursors are included within the scope of the terms, "precipitated zinc oxide precursor", and "precipitated aluminum oxide precursor", as those terms are used herein.

Preferably the spray drying conditions are adjusted to provide "green" spray dried particles of a size such that at least 80 percent by volume of the particles have a diameter between 50 and 255 μm. Conventional spray drying processes and apparatus are well known to those skilled in the art. The selection of apparatus and process conditions to achieve the foregoing particle size distribution can be readily achieved by a skilled artisan apprised of present disclosure. Advantageously the slurry is spray dried into a conventional, heated zone which is heated by a feed gas provided at a temperature sufficient that outlet gasses from the spray drying chamber have a temperature above about 265° F. (129° C.). Preferably the slurry has a solids content (upon drying at 265° F.) of between about 10 and 25 wt % based on the adjusted weight of the slurry, and thus undergoes a loss of water content of between 75 and 90 wt % at 265° F.

The 'green' spray dried particles are preferably calcined in an oxygen containing environment to convert the aluminum oxide precursor to zinc aluminate and the remaining zinc oxide precursor to zinc oxide. The calcining step also results in shrinkage of the spray dried particles to an average size distribution within the range of 35 to 175 μm. Typically the calcining temperature exceeds 300° C., and is preferably a temperature exceeding 500° C., more preferably 600° C., or higher, e.g., 650° C. Preferably the calcining is conducted at a temperature that is about the same, or higher, than the intended initial regeneration temperature. This technique, as will be known to the skilled artisan, can enhance stabilization of the physical and chemical properties of the sorbent during its subsequent use.

In one preferred aspect of the invention, the zinc-oxide based sorbent is prepared by the following steps. Prepare an aqueous solution containing zinc nitrate and aluminum nitrate in amounts corresponding to adjusted weight percent of 58 wt % ZnO to 42 wt % $Al_2O_3$, with 8 to 9 wt % as zinc metal. Prepare an ammonium hydroxide solution (14.8 N) in a separate container, and pump the two solutions into a well stirred container at a controlled flow rate to precipitate the zinc oxide and aluminum oxide precursors at a pH of 6.0±0.2 at room temperature. Wash the precipitate with deionized water using pressure or vacuum filtration to remove excess $NH_4OH$ and form a wet cake. Add sufficient distilled water to reslurry the cake to provide a slurry with a zinc metal content of 7 to 8 wt %. Then add sufficient concentrated nitric acid to bring the pH down to 4.0 to 4.2. Spray dry the resultant slurry in a drying chamber with an air outlet temperature of 350 to 360° F. to produce microspheroidal particles of a size in the range of 50 to 255 μm. Calcine the spray dried particles in air at 650° C. for 2 hours to shrink the particles to a size in the range of 35 to 175 pm, and convert the zinc oxide and alumina precursors into zinc aluminate and zinc oxide.

One preferred apparatus for carrying out hot gas desulfurization processes in accord with the invention is shown in the FIGURE. In particular, the FIGURE illustrates a transport reactor system of the type described in; Campbell, William N. and Henningsen, Gunnar B., *Hot Gas Desulfurization Using Transport Reactors*, publication from the M. W. Kellogg Company, pp 1059-64, 12th Annual International Pittsburgh Coal Conference Proceedings, September 1995; and also in U.S. Pat. No. 5,447,702, issued on Sep. 5, 1995 to Campbell et al. The disclosures of the foregoing Campbell et al. publication and the Campbell et al. U.S. Patent are hereby incorporated by reference herein in their entireties.

Returning to the FIGURE, the transport reactor system includes a sulfidation reactor 10 (absorber) and a regeneration reactor 12 which are dynamically coupled together as shown in the drawing. The sorbent is continuously transferred from the absorber 10 to the regenerator 12 via lines 14 and 16, and returned from the regenerator 12 to the absorber 10 via line 18. The sorbent is continuously circulated within both reactors 10 and 12 as will be apparent.

Raw syngas is advantageously fed via line 20 into the absorber 10 at a temperature of from about 450° F. to about 500° F. (232° C. to 260° C.) and is heated to a temperature of about 550° F. to about 1000° F. (288° C. to 538° C.), preferably about 550° F. to about 750° F. (288° C. to about 399° C.) as a result of mixing with the hot sorbent which is returned to the absorber 10 from the regenerator 12 via line 18. Sulfur gases are removed in the absorber 10 from the syngas by the sorbent with the result that clean syngas is recovered via line 20 from an upper portion of the absorber 10. Sulfided sorbent is separated from the clean syngas by any of various well known apparatus (not shown) such as a cyclone separator or the like, and the sulfided sorbent is recovered in line 22, with all or a portion of the sulfided sorbent being fed via line 16 to the regenerator 12 for regeneration. Fresh make-up sorbent is supplied to the absorber 10 via feed line 24.

An oxygen-containing gas stream, which is preferably air or diluted air is supplied to the regenerator 12 via line 26. Preferably the oxygen-containing gas is preheated by means not shown, upstream of the regenerator 12, to a temperature sufficiently high such that the temperature of the sorbent fed via line 16 into the regenerator 12, is heated to a temperature of at least about 950° F. (about 510° C.), preferably to a temperature of at least about 1000° F. (538° C.) by contact with the heated oxygen-containing gas from line 26. In addition, or alternatively, the sulfided sorbent which is fed via line 16 into the regenerator 12 can be heated by a heater 28, of conventional construction, positioned upstream of the regenerator 12. In the regenerator 12, oxygen reacts exothermically with sulfur, to remove same from the sorbent, and a tailgas stream containing $SO_2$ is recovered via line 30 from an upper portion of the regenerator 12.

Preferably, the regenerator is operated under conditions sufficient to maintain a regeneration temperature in the regeneration zone in the range of between about 950° F. and about 1350° F. (about 510° C. to about 732° C.), preferably within the range of between about 1000° F. and about 1300° F. (about 538° C. and about 704° C.). It has been found according to preferred process embodiments of the invention that the chemical activity and physical stability of the sorbent, during multiple regeneration cycles, is enhanced by operating the regeneration process in these temperature ranges. Regenerated sorbent is separated from the tailgas by any of various well known apparatus (not shown) such as a cyclone separator or the like, and the regenerated sorbent is returned via line 16 to the absorber 10.

The reaction or reactions occurring in the absorber is as follows:

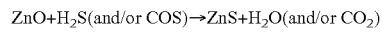

$$ZnO+H_2S(\text{and/or COS}) \rightarrow ZnS+H_2O(\text{and/or } CO_2)$$

while the reaction occurring in the regenerator is:

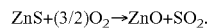

$$ZnS+(3/2)O_2 \rightarrow ZnO+SO_2.$$

The heat of the regeneration reaction is used to heat the sorbent to the desired regeneration temperature. In particular, the regenerator is operated within a temperature window of about 1200° F. to about 1350° F. (649° C. to 732° C.) to minimize formation of undesirable zinc sulfate via the reaction:

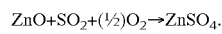

$$ZnO+SO_2+(1/2)O_2 \rightarrow ZnSO_4.$$

The following examples illustrate preparation and use of currently preferred sorbents according to the present invention.

Example 1

Preparation of sorbent materials was conducted as follows. 1841.6 g of $Al_2(NO_3)_3 \cdot 9H_2O$ and 1279.8 g of $Zn(NO_3)_2 \cdot 6H_2O$ was dissolved in deionized (DI) water and the solution was brought up to 4 liters by addition of DI water. In a second container, enough ammonium hydroxide and DI water was added to generate a 14.8 N solution. Two pumps were used to feed the base solution and zinc nitrate/aluminum nitrate solution into a large mixing vessel precipitating the zinc oxide and aluminum oxide precursors at room temperature. The contents of the mixing vessel were continuously mixed by mechanical agitation of a stirring motor. The pH in the mixing tank was controlled at 6.0±0.2 during the precipitation by adjusting the flow rate of the base solution. After all the zinc nitrate/aluminum nitrate solution had been consumed, a Buchner funnel and Whatman P4 filter paper filtered the precipitate from the solution. The precipitate was washed with 12 liters of DI water to remove any residual ammonia hydroxide and create a wet cake. One liter of DI water was added to reslurry the wet cake. Nitric acid (70%) was added to this slurry reducing the pH to between 3.6 and 4.2. The slurry was homogenized and filtered through a 450 μm screen. The slurry was spray dried in a Niro Mobile Minor spray dryer capable of evaporating 7 kg/h of water. The outlet temperature of the spray drier was maintained between 120 to 140° C. The coarse and fine material collected from the spray dryer was calcined in an air purged calcination furnace for 2 h at 650° C. The final calcined material was screened to obtain sorbent having a particle size of from 38 μm to 150 μm for testing and characterization.

This set of procedures was used to prepare a number of distinct samples for which the only difference was the amount of 70% nitric acid and final pH of the slurry solution prior to spray drying. Key physical and chemical properties of the sorbent material are presented in the Table 1.

TABLE 1

Physical Characterization Tests Results for Different Sorbent Preparations

| Sample No. | Final pH | Compacted Bulk Density (g/ml) | Pore Volume (ml/g) | BET Surface Area ($m^2/g$) | Attrition Index (AI) (ASTM D5757) Fresh |
|---|---|---|---|---|---|
| 032202-1 | 4.16 | 1.49 | 0.1456 | 24.58 | 1.02 |
| 021502-2 | 4.29 | 1.46 | 0.1437 | 27.11 | 1.18 |
| 011102-3 | 3.60 | 1.71 | 0.0844 | 26.99 | 0.55 |
| 071502-1 | 4.23 | 1.32 | 0.2559 | 22.37 | 1.39 |

Example 2

Several additional smaller batches of sorbent material were prepared according the procedures outlined in Example 1 with the following changes. The total volume of the zinc nitrate/aluminum nitrate solution was 2 liters. This solution was prepared by dissolving 920.8 g of $Al_2(NO_3)_3 \cdot 9H_2O$ and 639.9 g of $Zn(NO_3)_2 \cdot 6H_2O$ in DI water and adding enough DI water to make 2 liters. The precipitate cake was washed with 6 liters of DI water. The precipitate cake was reslurried in 500 ml of DI water.

The key physical and chemical properties of the sorbent materials are provided in Table 2.

TABLE 2

Physical Characterization Tests Results for Different Sorbent Preparations

| Sample No. | Final pH | Compacted Bulk Density (g/ml) | Pore Volume (ml/g) | BET Surface Area ($m^2/g$) | Attrition Index (AI) (ASTM D5757) Fresh |
|---|---|---|---|---|---|
| 071602-1 | 3.6 | 1.80 | 0.0953 | 16.69 | 0.48 |
| 071702-1 | 4.0 | 1.38 | 0.1942 | 17.96 | 2.28 |
| 080102-1 | 4.4 | 1.32 | 0.2005 | 20.73 | 2.94 |

Example 3

Preparation of a Special Batch of Sorbent Materials was Conducted as Follows. 1500.46 g of $Al_2(NO_3)_3 \cdot 9H_2O$ and 1892.4 g of $Zn(NO_3)_2 \cdot 6H_2O$ was dissolved in deionized (DI) water and the solution was brought up to 3.5 liters by addition of DI water. In a second container, enough ammonium hydroxide and DI water was added to generate a 14.8 N solution. Two pumps were used to feed the base solution and zinc nitrate/aluminum nitrate solution into a large mixing vessel precipitating the zinc oxide and aluminum oxide precursors at room temperature. The contents of the mixing vessel were continuously mixed by mechanical agitation of a stirring motor. The pH in the mixing tank was controlled at 6.0±0.2 during the precipitation by adjusting the flow rate of the base solution. After all the zinc nitrate/aluminum nitrate solution had been consumed, a Buchner funnel and Whatman P4 filter paper filtered the precipitate from the solution. The precipitate was washed with 12 liters of DI water to remove any residual ammonium hydroxide and create a wet cake. 1.2 liter of DI water was added to reslurry the wet cake. 160 ml of nitric acid (70%) was added to this slurry reducing the pH to about 3.6. The slurry was homogenized and filtered through a 450 μm screen. The slurry was spray dried in a Niro Mobile Minor spray dryer capable of evaporating 7 kg/h of water. The outlet temperature of the spray dried was maintained between 120 to 140° C. The coarse and fine material collected from the spray dryer was calcined in an air purged calcination furnace for 2 h at 650° C. The final calcined material was screened to obtain the −38 to +150 μm for testing and characterization.

The characterization results for this material are provided in Table 3.

TABLE 3

Physical Characterization Tests Results for Different Sorbent Preparations

| Sample No. | Final pH | Compacted Bulk Density (g/ml) | Pore Volume (ml/g) | BET Surface Area ($m^2/g$) | Attrition Index (AI) (ASTM D5757) Fresh |
|---|---|---|---|---|---|
| 010702-3A | 3.56 | 1.51 | 0.1029 | 54.81 | N/A |

Example 4

The basic preparation procedures described in Example 1 were used to prepare three sorbent materials with iron and copper as promoters. As in the basic procedure in Example 1, a nitrate solution was prepared. For these promoted sorbent materials, iron and copper nitrate was also included in this nitrate solution. The exact amount of each nitrate added for the three promoted sorbent materials is provided in Table 4.

TABLE 4

Amount of Each Nitrate Added During Preparation of Nitrate Solution

| Sample | $Fe(NO_3)_3 \cdot 9H_2O$ (g) | $Cu(NO_3)_2 \cdot 2.5H_2O$ (g) | $Zn(NO_3)_2 \cdot 6H_2O$ (g) | $Al_2(NO_3)_3 \cdot 9H_2O$ (g) |
|---|---|---|---|---|
| 021402-1 | 132.5 | | 1073.64 | 1500.46 |
| 022502-1 | | 14.5 | 1047.76 | 1500.46 |
| 031102-1 | 285.45 | | 1110.46 | 1500.46 |

After the preparation of the nitrate solution, the sequence of procedures used to make these promoted sorbent material was exactly the same as used in Example 1. The chemical and physical characterization results for these promoted samples are provided in Table 5.

TABLE 5

Physical Characterization Test Results for Different Sorbent Preparations

| Sample No. | Nitric Acid Added (ml) | Final pH | Compact Bulk Density (g/ml) |
|---|---|---|---|
| 021402-1 | 90 | 4.15 | 1.51 |
| 022502-1 | 90 | 4.23 | 1.42 |
| 031102-1 | 135 | 4.56 | 1.51 |

Example 5

This example compares crystallite properties of sorbents prepared by in situ conversion of precipitated precursors to the two phase zinc oxide and zinc aluminate composition, to a comparative material prepared from a slurry of zinc oxide and alumina.

For this comparative sample, the starting materials were the exact stoichiometric amounts of ZnO and $Al_2O_3$ required to produce $ZnAl_2O_4$ with no excess ZnO or $Al_2O_3$. In particular, the comparative sample material was prepared by dry mixing 66.9 g of high surface area alumina powder (Englehard) with zinc oxide powder (Aesar). The materials were mixed for 60 minutes. This mixture was then dried overnight at 120° C. and calcined at 800° C. for 6 hours.

Samples of the comparative sorbent material prepared by dry mixing, and samples of sorbent materials prepared in accord with a preferred process of the present invention, i.e., by conversion of precipitated precursors to the final oxides, were analyzed by X-ray diffraction and by x-ray diffraction line broadening analysis to determine identity of the final materials, and their crystallite sizes. The phase materials identified, and their crystallite sizes, measured at the 2θ angles set forth, are shown in Table 6. In addition to the differences in the crystallite sizes, it is to be noted that in the comparative sample prepared from mixed oxides, there remained some zinc oxide and alumina (in the form of corundum), that were not converted to zinc aluminate. The fact that ZnO and $Al_2O_3$ remain after calcination shows the mixing achieved by mixing these oxides was not sufficient to allow rapid reaction between the ZnO and $Al_2O_3$.

Example 6

In larger commercial processing equipment, a 600 lb batch of sorbent material was prepared. Preparation began with the nitrate solution by mixing 3396.9 lb of a commercial aluminum nitrate solution containing 3.9 wt % aluminum, 1560.8 lb of a zinc nitrate solution containing 18 wt % zinc and 777.4 lb of DI water. For the base solution, 240 gallons of 29% ammonium hydroxide was mixed with 240 gallons of DI water. In a small mixing tank, precipitate was formed by mixing the nitrate solution and base at a pH of 6.0±0.2. Any overflow from this small mixing tank was collected in a larger overflow tank. The precipitate was mixed with 4,000 lb of water and vigorously mixed to wash material. This slurry was then filtered in a press filter in 4 nearly equal batches to form 4 separate cake batches of approximately 1000 lb each. Two of these cakes were washed and filtered 2 more times each with about 1000 lb of water. The other two batches were washed and filtered 1 more time each with about 1000 lb water. Each batch was then reslurried with water and nitric acid as shown in Table 7. The homogenized slurry was pumped from a mixing tank through a filter to a feed tank for a 24 ft diameter spray dryer. The slurry was pumped into the spray dryer at 300 psig through three 1.55 mm nozzles. The outlet temperature of the spray drier was between 350 and 365° F. After spray drying, the sorbent was dried in a rotary calcination oven at 650° C. at a throughput rate of 150 lb/h. The calcined material was screened to separate the particles between −38 to 150+μm.

Physical and chemical characterization results for this sample are provided in Table 7.

TABLE 7

Physical Characterization Tests Results for Different Sorbent Preparations

| Batch No. | Reslurry Conditions | | $BET^3$ ($m^2/g$) | $CBD^4$ (g/ml) | Pore Volume (ml/g) | $Al^5$ |
| | $HNO_3^1$ (ml) | DI Water$^2$ (ml) | | | | |
|---|---|---|---|---|---|---|
| Batch 1 | 0.02 | 0.40 | 39.53 | 1.69 | 0.129 | 0.85 |
| Batch 2 | 0.032 | 0.293 | 38.18 | 1.76 | 0.122 | 0.74 |

TABLE 6

X-Ray Diffraction Analysis of Dry Mixed and Coprecipitated Samples

| | Method | Zincite 2θ | A° | Galnite 2θ | A° | Corundum 2θ | m A° |
|---|---|---|---|---|---|---|---|
| $ZnAl_2O_4$ | Mixing | 36.281 | >1000 | 36.865 | 580 | 43.398 | 552 |
| 25% ZnO/$ZnAl_2O_4$ (Batch 2, see Table 7) | Precipitation | 36.310 | 173 | 36.795 | 96 | — | ND |
| 25% ZnO/$ZnAl_2O_4$ (012902-4) | Precipitation | 36.340 | 151 | 36.740 | 107 | — | ND |

ND—Not detected

TABLE 7-continued

Physical Characterization Tests Results for Different Sorbent Preparations

| Batch No. | Reslurry Conditions | | BET[3] ($m^2/g$) | CBD[4] (g/ml) | Pore Volume (ml/g) | AI[5] |
|---|---|---|---|---|---|---|
| | $HNO_3$[1] (ml) | DI Water[2] (ml) | | | | |
| Batch 3 | 0.02 | 0.40 | 37.8 | 1.70 | 0.098 | 0.30 |
| Batch 4 | 0 | 0.88 | 52.3 | 1.24 | 0.246 | 1.90 |

[1]Pounds of 62% nitric acid added per lb of cake
[2]Pounds of DI water added per lb of cake
[3]BET surface area
[4]Compact bulk density
[5]Attrition index (FCC ECAT 0.83)

Example 7

The sulfur removal and regeneration potential of the sorbent material prepared in Example 6 was tested in a high-temperature, high-pressure bench scale reactor test facility. A 2-in internal diameter quartz reactor was filled with 301.9 g of sorbent material generated in Example 6. The system was pressurized at 600° F. to 280 psig with nitrogen. The flow rate was increased to 20 SLPM. The nitrogen was switched with a syngas containing 60 vol % steam, 21 vol % CO, 14.1 vol % $H_2$, 4.4 vol % $CO_2$ and 5000 ppmv of $H_2S$. The effluent gas from the reactor was cooled to condense the steam and a slipstream sent to a Hewlett Packard gas chromatograph equipped with a sulfur chemiluminescence detector for $H_2S$, COS and $SO_2$ analysis. These conditions for sulfur removal were maintained until the effluent concentrations of sulfur exceeded 100 ppmv. At this time, the syngas was replaced with nitrogen and the reactor temperature was increased to 1150° F. for regeneration. When the reactor temperature was 1150° F. and the syngas had been purged from the system, the nitrogen was replaced with a mixture containing 6 vol % $O_2$ in $N_2$. During regeneration, the reactor effluent was analyzed with a continuous photometric $SO_2$ analyzer and continuous Teledyne $O_2$ analyzer. These procedures for sulfur removal and regeneration were repeated 5 times.

The results from the sulfur removal portion of this testing demonstrated that the sorbent was able to reduce the effluent sulfur concentrations to ≦10 ppmv from the 5,000 ppmv sulfur in the raw syngas consistently for five sequential exposures or cycles. The total time the sorbent was able to maintain the effluent sulfur concentration below 10 ppmv was approximately 200 minutes in each cycle.

Similarly, the sorbent was successfully regenerated during these five cycles. During regeneration, the effluent $SO_2$ concentration would climb to and remain at roughly 3.5 vol % $SO_2$ and the temperature in the sorbent bed would increase to between 1300 and 1350° F. When essentially all the sulfur on the sorbent had been removed, the effluent concentration of $SO_2$ began to rapidly decline and the effluent $O_2$ concentration increased. Prior to this event, the effluent $O_2$ concentration was zero.

Example 8

The sulfur removal and regeneration performance of the sorbent batch prepared in Example 6 were tested in a single loop transport reactor system. A total of 22 lb of the sorbent was loaded in the reactor. The sorbent was circulated with approximately 525 scfh of nitrogen at 130 psig at 600° F. with a solids circulation rate of 200 lb/h. After establishing circulation in nitrogen, the nitrogen was replaced by a syngas mixture containing 60 vol % steam, 18.3 vol % CO, 13.5 vol % $H_2$, 4.2 vol % $CO_2$, 3.5 vol % $N_2$, 5000 ppmv $H_2S$ and 200 ppmv COS. The reactor effluent was cooled to condense the steam and a dry sample of the reactor effluent was sent to a Varian 3300 gas chromatograph equipped with a flame photometric detector. The sulfur removal was terminated when the sulfur in the effluent stream exceeded 50 ppmv on a dry basis. The syngas was replaced with nitrogen and the sorbent contents circulated to purge the syngas from the system. The sorbent circulation was stopped and minimal nitrogen flow was maintained in the reactor while the reactor was heated to 1200° F. At 1225° F., the circulation was reestablished with about 340 scfh of nitrogen. The regeneration was started by switching to a mixture containing roughly 10 vol % oxygen in nitrogen. The regeneration was terminated when the $O_2$ concentration in the effluent increases and $SO_2$ in the effluent decreases.

During sulfur removal, no sulfur compounds were detected in the reactor effluent for about 2.5 hours of exposure. After 3 hours, the sulfur effluent concentration had increased to 5 ppmv dry. The exposure to syngas was terminated after 3.75 hours. During regeneration, a temperature rise of about 70° F. was observed in the reactor with 5.1 vol % $SO_2$ and no detectable concentration of $O_2$ for 40 minutes. In addition, no fines were collected after circulation of the sorbent.

The invention has been described in considerable detail with reference to its preferred embodiments. However, it will be understood that numerous variations and modifications can be made without departure from the spirit and scope of the invention as set forth in the foregoing detailed disclosure and defined in the appended claims.

That which is claimed:

1. A process for preparing fluidizable, attrition resistant sorbent particles, comprising:
    providing a slurry of a zinc oxide precursor and an aluminum oxide precursor, the zinc oxide precursor and the aluminum oxide precursor being selected such that a mixture of the precursors can be converted to zinc oxide and zinc aluminate;
    spray drying the slurry to form spray dried particles comprising a mixture of the zinc oxide precursor and the aluminum oxide precursor; and
    converting the zinc oxide precursor and the aluminum oxide precursor in the spray dried particles to zinc oxide and zinc aluminate to form fluidizable sorbent particles comprising a two phase active zinc component comprising a zinc oxide phase and a zinc aluminate phase.

2. The process of claim 1, wherein the zinc oxide precursor and the aluminum oxide precursor are each selected from the group consisting of nitrates, sulfates, chlorides, acetates, and alkoxides.

3. The process of claim 1, wherein the zinc oxide precursor is zinc nitrate and the aluminum oxide precursor is aluminum nitrate.

4. The process of claim 1, wherein the zinc oxide phase and the zinc aluminate phase of the fluidizable sorbent particles each have a crystallite size of less than about 500 Angstroms as determined by x-ray diffraction line broadening analysis.

5. The process of claim 1, wherein said providing step comprises preparing a solution of a zinc oxide precursor and an aluminum oxide precursor, and precipitating the zinc oxide precursor and the aluminum oxide precursor to form the slurry.

6. The process of claim 5, wherein said precipitating step comprises mixing the solution with a base.

7. The process of claim 1, wherein the slurry has 88 to 92 weight percent loss on ignition at a temperature of 500° C. or greater.

8. The process of claim 1, wherein the zinc oxide precursor, calculated as zinc oxide, comprises at least about 50 wt % of the dry solids content of the slurry.

9. The process of claim 8, wherein the zinc oxide precursor, calculated as zinc oxide, comprises about 50 to about 80 wt % of the dry solids content of the slurry.

10. The process of claim 1, wherein the aluminum oxide precursor, calculated as alumina, comprises at least about 20 wt % of the dry solids content of the slurry.

11. The process of claim 10, wherein the aluminum oxide precursor, calculated as alumina, comprises about 20 to about 50 wt % of the dry solids content of the slurry.

12. The process of claim 1, wherein at least 80 percent by volume of the spray dried particles have a size in the range of from 50 to 255 micrometers prior to said converting step.

13. The process of claim 1, wherein the fluidizable sorbent particles have a size in the range of from 35 to 175 micrometers.

14. The process of claim 1, wherein said converting step comprises calcining the spray dried particles at a temperature of at least about 300° C.

15. The process of claim 14, wherein the calcining temperature is at least about 500° C.

16. The process of claim 15, wherein the calcining temperature is at least about 600° C.

17. The process of claim 1, wherein said spray drying step comprises spray drying the slurry into a heated zone having a temperature of at least about 129° C.

18. The process of claim 1, further comprising treating the slurry with an acid sufficient to reduce the pH of the slurry to less than 4.5 prior to said spray drying step.

19. The process of claim 18, wherein the treating step results in a slurry pH of 4.0 to 4.3.

20. A process for preparing fluidizable, attrition resistant sorbent particles, comprising:
providing an aqueous slurry of a precipitated zinc oxide precursor and a precipitated aluminum oxide precursor, the zinc oxide precursor and the aluminum oxide precursor being selected such that a mixture of the precursors can be converted to zinc oxide and zinc aluminate;
adjusting the pH of the aqueous slurry to a pH of less than 4.5;
spray drying the aqueous slurry to form spray dried particles comprising a mixture of the zinc oxide precursor and the aluminum oxide precursor; and
calcining the zinc oxide precursor and the aluminum oxide precursor in the spray dried particles to zinc oxide and zinc aluminate to form fluidizable sorbent particles comprising a two phase active zinc component comprising a zinc oxide phase and a zinc aluminate phase.

21. The process of claim 20, wherein the temperature of said calcining step is at least about 300° C.

22. The process of claim 21, wherein the temperature of said calcining step is at least about 500° C.

23. The process of claim 22, wherein the temperature of said calcining step is at least about 600° C.

24. The process of claim 20, wherein the zinc oxide precursor is zinc nitrate and the aluminum oxide precursor is aluminum nitrate.

25. The process of claim 20, wherein the zinc oxide precursor, calculated as zinc oxide, comprises at least about 50 wt % of the dry solids content of the slurry.

26. The process of claim 20, wherein the aluminum oxide precursor, calculated as alumina, comprises at least about 20 wt % of the dry solids content of the slurry.

27. The process of claim 20, wherein the zinc oxide phase and the zinc aluminate phase of the fluidizable sorbent particles each have a crystallite size of less than about 500 Angstroms as determined by x-ray diffraction line broadening analysis.

28. A process for preparing fluidizable, attrition resistant sorbent particles, comprising:
providing an aqueous solution of a zinc oxide precursor and an aluminum oxide precursor, the zinc oxide precursor and the aluminum oxide precursor being selected such that a mixture of the precursors can be converted to zinc oxide and zinc aluminate;
coprecipitating the zinc oxide precursor and the aluminum oxide precursor to form an aqueous slurry of a precipitated zinc oxide precursor and a precipitated aluminum oxide precursor;
adjusting the pH of the aqueous slurry to a pH of less than 4.5;
spray drying the aqueous slurry to form spray dried particles comprising a mixture of the zinc oxide precursor and the aluminum oxide precursor; and
calcining the zinc oxide precursor and the aluminum oxide precursor in the spray dried particles to zinc oxide and zinc aluminate to form fluidizable sorbent particles comprising a two phase active zinc component comprising a zinc oxide phase and a zinc aluminate phase, wherein the calcining temperature is at least about 500° C.

29. The process of claim 28, wherein the zinc oxide precursor is zinc nitrate and the aluminum oxide precursor is aluminum nitrate.

30. The process of claim 28, wherein the zinc oxide precursor, calculated as zinc oxide, comprises at least about 50 wt % of the dry solids content of the slurry.

31. The process of claim 28, wherein the aluminum oxide precursor, calculated as alumina, comprises at least about 20 wt % of the dry solids content of the slurry.

32. The process of claim 28, wherein the zinc oxide phase and the zinc aluminate phase of the fluidizable sorbent particles each have a crystallite size of less than about 500 Angstroms as determined by x-ray diffraction line broadening analysis.

* * * * *